United States Patent
Horn et al.

(10) Patent No.: US 6,842,574 B1
(45) Date of Patent: Jan. 11, 2005

(54) OPTICAL WAVE-GUIDE

(75) Inventors: Hans-Matthias Horn, Neustadt (DE); Joachim Schaefer, Neustadt (DE); Ilona Schmidt, Neustadt (DE); Helmut Thullen, Bonaduz (CH); Volker Eichhorn, Chur (CH); Thomas Wutke, Waldbröl (DE); Georg Stoeppelmann, Bonaduz (CH)

(73) Assignee: EMS-Chemie AG (CH)

( * ) Notice: Subject to any disclaimer, the term of this patent is extended or adjusted under 35 U.S.C. 154(b) by 0 days.

(21) Appl. No.: 09/937,817

(22) PCT Filed: Mar. 30, 2000

(86) PCT No.: PCT/EP00/02831
§ 371 (c)(1),
(2), (4) Date: Nov. 29, 2001

(87) PCT Pub. No.: WO00/60382
PCT Pub. Date: Oct. 12, 2000

(30) Foreign Application Priority Data

Mar. 31, 1999 (DE) .......................................... 199 14 743

(51) Int. Cl.⁷ ................................................. G02B 6/02
(52) U.S. Cl. .................... 385/128; 427/162; 427/163.1; 427/163.2
(58) Field of Search ................................ 385/114, 128; 427/162, 163.1, 163.2; 524/117; 350/96.34

(56) References Cited

U.S. PATENT DOCUMENTS 4,593,974 A * 6/1986 Yamamoto et al. ...... 350/96.34
6,064,790 A * 5/2000 Yang et al. .................. 385/114
6,153,677 A * 11/2000 Dalla Torre et al. ........ 524/117

FOREIGN PATENT DOCUMENTS

| EP | 0 239 935 A | 10/1987 |
| EP | 0 649 738 A | 4/1995 |
| EP | 0767190 A | 4/1997 |
| EP | 0 883 001 A | 12/1998 |
| GB | 2198258 A | 6/1988 |
| JP | 04127107 | 4/1992 |
| WO | 95/24450 | 9/1995 |

* cited by examiner

Primary Examiner—Audrey Chang
Assistant Examiner—Craig Curtis
(74) Attorney, Agent, or Firm—J. Herbert O'Toole; Nexsen Pruet, LLC

(57) ABSTRACT

The car industry increasingly uses plastic optical fibers whose protective sheathing (4) is made of a polyamide. As unmodified PA poorly adheres to the fluoropolymers often used as the material for the fiber cladding (3), the plastic optical fiber (2, 3) moves in relation to the protective sheathing (4) when the temperature varies. To suppress this effect referred to as "pistoning", the connectors and holders of the optical fibers must apply very large clamping forces to the protective sheathing (4) and the plastic optical fiber (2, 3) arranged therein, resulting in an increased signal attenuation. The use of a modified PA can clearly improve the adherence of the protective sheathing (4) to the cladding (3) of a plastic optical fiber which is made of a fluoropolymer. As the protective sheathing material, particularly a modified PA 12 whose maximum concentration of the carboxyl terminal groups of the polyamide is 15 $\mu$eq/g and whose concentration of the amino terminal groups is in the range of 50 $\mu$eq/g to 300 $\mu$eq/g may be used.

Figure 1:
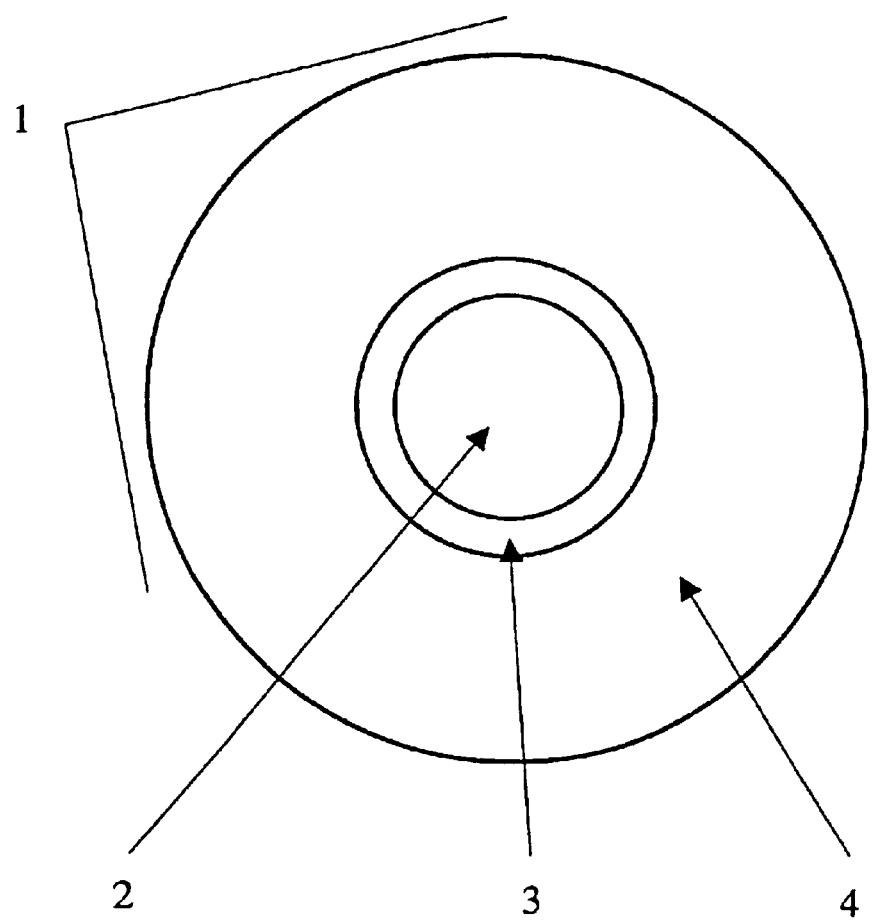

17 Claims, 1 Drawing Sheet 1  2  3  4

OPTICAL WAVE-GUIDE

The present invention relates to optical wave-guides having a plastic optical fiber comprising a fiber core and a fiber cladding having a single- or multilayer structure, and at least one protective sheathing. The fiber cladding or at least its outer layer may be made of a fluorine-containing plastic. For the protective sheathing of the fiber core, polyamide may be used.

Plastic optical fibers are used in the field of telecommunication as an optical transmission element which is insusceptible to interference and is easy to handle wherever the distance between the transmitting unit and the receiving unit is only a few meters up to a maximum of 100–150 meters. In the fields of traffic engineering/car manufacturing (data and signal transmission in vehicles, aeroplanes, ships, etc.), lighting (variable message signs), automatic control engineering (machine control) and sensor technology too, plastic optical fibers are gaining increasing importance [Draht (Wire) 46 (1995) 4, pp. 187–190].

A plastic optical fiber used for data and signal transmission consists of a fiber core ($\emptyset_{core} \approx 980 \, \mu m$), which is often made of polymethyl methacrylate (PMMA; refractive index $n_{PMMA}=1.49$), and a fiber cladding (outer diameter $\emptyset_{cladding} \approx 1000 \, \mu m$) having a single- or multilayer structure which concentrically encloses the fiber core. Fluorine-containing plastics whose refractive index $n_{cladding}$ ranges from 1.35 to 1.42 are mainly used as the cladding material. The optical absorption of such a plastic wave-guide is typically 130–150 db/km ($\lambda=650$ nm), the minimum bending radius is approx. 5–10 mm.

To protect the sensitive plastic optical fiber from mechanical, thermal and chemical effects, it is provided with a plastic cladding hereafter referred to as protective sheathing which may have a multilayer structure (WO 99/12063). The protective sheathing (outer diameter $\emptyset_{wave-guide} \approx 1.5$–2.2 mm) coated by means of an extruder may, depending on the intended use or application, be made of polyethylene (PE), polyvinyl chloride (PVC), ethylene vinylacetate (EVA) or polyamide (PA), for example.

In the field of car manufacturing, polyamides are used as a protective sheathing material, as it meets the requirements there in terms of mechanical strength (tensile strength, lateral compression strength), maximum application temperature, and chemical resistance. However, the poor adhesion of the polyamide protective sheathing to the plastic optical fiber whose fiber cladding is made of a fluorine-containing polymer causes problems. The weak adhesion of the protective sheathing has a particularly adverse effect when the optical wave-guide (plastic optical fiber plus protective sheathing) is installed in an environment (e.g. passenger compartment of a motor vehicle) which is subject to large variations in temperature and the plastic optical fiber moves in relation to the protective sheathing due to the fiber's varying thermal expansion behavior and the poor adhesion of the polyamide to the fluoropolymer. As a result, the distance between the face of the plastic optical fiber and the transmitting and receiving elements (LED/p-i-n diode) possibly increases to such an extent that unacceptably high intensity losses occur which may lead to the failure of the data transmission line. Moreover, there is a risk that the transmitting or receiving elements might be damaged if the plastic optical fiber moves too far out of the protective sheathing.

To suppress this effect which is referred to as "pistoning" of the plastic optical fiber, connectors, couplers or holders are used which apply large clamping or crimping forces to the protective sheathing to thereby increase the friction between the protective sheathing and the plastic optical fiber. The resulting deformation of the interface between fiber core and fiber cladding leads, however, to an increased signal attenuation.

Removing the protective layer within the connector avoids pistoning but involves the risk that the fiber cladding might be damaged during the assembly due to improper handling of the shouldering tool equipped with a pair of knives.

The clamping or crimping forces applied by the connector to the optical wave-guide can also be reduced by positively anchoring the plastic optical fiber in a tapered hole of the connector housing. It was proposed, for example, that the face of the plastic optical fiber should be partly melted by means of a hot plate, the resulting melting build-up should be pressed into the connector hole tapering inwards to thereby firmly anchor the plastic optical fiber to the connector housing. In the partly molten and thus deformed area, the geometry of the plastic optical fiber may possibly substantially deviate from the cylinder geometry enabling total reflection so that increased intensity losses occur in the connector housing.

EP 0 649 738 A1 discloses that a non-positive compound of polyamide and polyvinylidene chloride may be prepared by admixing a polyglutarimide to the polyamide. By a single-step extrusion process, for example, a two-layer composite can be made from a polyamide and a polyvinylidene fluoride and a three-layer composite can be made from a polyamide, an adhesion promoter layer of a polyamide-polyglutarimide blend and a polyvinylidene fluoride. Polyglutarimides are also known as polymethacryl imides (PMMI).

In the extrusion processing of plastic optical fibers it is important that the protective sheathing which directly contacts the fiber cladding is applied at a temperature as low as possible. The glass-transition temperatures of the fluorine-containing polymers of the fiber cladding are in close proximity to those of the fiber core material (PMMA: 106° C.), i.e. between 80 and 120° C. The thickness of the fiber cladding is, however, only 10 $\mu m$, its optical properties are precisely adjusted and can easily be influenced or changed by thermal or chemical effects. Therefore, the materials of the protective sheathing must be extruded at a melting temperature as low as possible.

When the inventors of the present application tested blends of PMMI (Pleximid 130, manufactured by Röhm, Germany) and low-viscous polyamide 12 (relative viscosity 1.65, 0.5% measured in m-cresol), they could find that the high blend viscosity resulted in clearly high melting temperatures in the cable extrusion of plastic optical fibers and an irreversible increase in the optical absorption of the fiber. Blends of polyamide 12 and PMMI can therefore not be used as materials for the protective sheathing.

Incidentally, the polyglutarimides given as examples of EP 0 649 738 A1 in the Table on page 6 have a very high viscosity and cannot be used as an intermediate layer for a three-layer process or as a component in the blend with polyamide 12 for the plastic optical fiber extrusion.

EP 0 767 190 A1 discloses the use of polyamide adhesion promoters for the manufacture of multilayer polymer pipes or piping, i.e. gasoline or coolant lines for the car manufacture. The polyamides used here have usually no low viscosity. Moreover, no optical properties of the layers are required either. But the polyamides described in EP 0 767 190 A1 have an excess of amino terminal groups. In extrusion tests with plastic optical fibers using the adhesion promoter disclosed in EP 0 767 190 A1 which were performed by the inventors of the present application, acceptable extrusion temperatures were achieved so that the optical fiber was not thermically damaged, but when the optical fiber was subsequently stored at a high temperature (80° C., 24 hours), the outer layer of the fiber, i.e. the cladding, turned brown. This seemed to have been caused by a diffusion of the monomers into the cladding and a subsequent chemical reaction. The discoloration had an adverse effect on the optical properties of the fiber. The polyamide moulding materials according to EP 0 767 190 A1 have thus to be ruled out as an adhesion promoter or protective layer for plastic optical fibers.

It is therefore the object of the present invention to provide an optical wave-guide with a slight relative motion even at large variations in temperature. The moulding material making up the protective sheathing should well adhere to the fiber cladding and should not chemically attack it. In addition, it should be ensured that the transmission behavior and the attenuation properties of the optical wave-guide largely correspond to those of the plastic optical fiber which is not enclosed by the moulding material.

The present invention relates therefore to an optical wave-guide 1 comprising a plastic optical fiber 2, 3 including a fiber core 2 and a fiber cladding 3 having a single- or multilayer structure, and at least one protective sheathing 4 enclosing the plastic optical fiber 2, 3. The fiber cladding 3 or at least its outer sheathing of a fluorine-containing plastic and the protective sheathing 4 are mainly made of polyamides (PA), preferably PA 11, PA 12, PA 610, PA 612, PA 1212 or the copolyamides PA 6/12, PA 6/9/6, PA 6/9/12, PA 610/6, PA 610/11, PA 610/12, PA 612/6, PA 612/11, PA 612/12 or mixtures thereof as well as other homopolyamides or copolyamides having a melting point of less than 220° C., preferably less than 210° C., particularly preferably less than 200° C., and the protective sheathing 4 is self-adhesively applied to the fiber cladding 3. The maximum concentration of the carboxyl terminal groups of the polyamide used is 15 $\mu$eq/g and the concentration of the amino terminal groups is in the range of 50 $\mu$eq/g to 300 $\mu$eq/g.

The optical wave-guide as claimed in claim 1 meets the above requirements.

The polyamides used according to the invention have a low viscosity so that they can be extruded at a melting temperature as low as possible. Specifically, the polyamides according to the invention have a viscosity below 2.0, in particular below 1.8 and particularly preferably a viscosity of 1.4 to 1.8 (relative viscosity: 0.5% measured in m-cresol). This serves to improve the quality of processing. A temperature test (80° C., 24 hours; see below) showed no discoloration of the outer layer of the fiber, i.e. the cladding, and hence no adverse effect on the optical properties of the fiber.

The subclaims include advantageous embodiments of the invention.

Due to the good adherence of the protective sheathing made of a modified PA to the fiber cladding of the plastic optical fiber, a connector slipped on the end side needs to apply clearly lower clamping or crimping forces to the optical wave-guide to avoid the effect referred to as pistoning. This reduces the signal attenuation in the plastic optical fiber which is caused by outer forces and allows the use of connectors or holders which have a comparatively simple structure and are therefore cheaper. Moreover, the protective sheathing near the connector is no longer needed to be removed. Even a 24-hour storage of the optical wave-guide at a temperature of 80° C. results in no increase in signal attenuation induced by chemical processes. There is specifically no discoloration of the fiber cladding.

The invention will now be explained with reference to the drawing and the embodiments, the single FIGURE showing the cross section of an embodiment of the optical wave-guide ("plastic optical fiber simplex wave-guide").

The optical wave-guide 1 which is shown schematically and not true to scale in a cross-sectional view in FIG. 1 is particularly used as a transmission element to transmit data and signals freely from unwanted signals within the passenger compartment of a motor vehicle. As a light-guiding structure, the wave-guide 1 contains a so-called step index profile plastic optical fiber which consists in the embodiment shown of a PMMA fiber core 2 ($\emptyset_{core}$=980 $\mu$m, refractive index $n_{core}$=1.49) and a fiber cladding 3 ($\emptyset_{cladding}$=1000 $\mu$m, refractive index $n_{cladding}$=1.35–1.42) made of a fluorine-containing polymer which has a single- or multilayer structure. As the plastic PMMA is very easy to cut and grind, the processing of the fiber face (which must be clean, smooth and free from striae) takes only little time. In addition, despite its relatively large diameter of approx. 1 mm the plastic optical fiber 2, 3 has an extremely high bending strength facilitating the assembly and installation. The optical absorption of the fiber core 2 is typically 70–100 db/km ($\lambda$=570 nm) or 125–150 db/km ($\lambda$=650 nm).

The fluorine-containing polymers used as the cladding material or as the material for the outer cladding layer may be pure polymers, copolymers of fluorine-containing monomers as well as copolymers of fluorine-containing monomers with acrylic acid and acrylates as well as mixtures of such polymers or copolymers. Vinylidene fluoride, tetrafluoroethylene, hexafluoropropene, methacrylic acid-tetrafluoropropylester, methacrylic acid-pentafluoropropylester, methacrylic acid-trifluoroethylester, methacrylic acid-heptadecafluorodecylester as well as mixtures or copolymerisates thereof, alternatively also acrylic acid- or acrylate-modified polymers, copolymers or polymer mixtures may be used in particular.

The outer diameters of the fiber core 2 and the fiber cladding 3 meet the standard specified in IEC 60 793-2 (outer diameter of cladding $\emptyset_{cladding}$=1000±60 $\mu$m, the core diameter $\emptyset_{core}$ should typically be smaller than $\emptyset_{cladding}$ by 10–20 $\mu$m; numerical aperture 0.5±0.15). It is of course also possible to select the dimensions of the fiber core 2 and the fiber cladding 3 according to the other standard values ($\emptyset_{cladding}$=750±45 $\mu$m or 500±30 $\mu$m) or to adapt the dimensions to the commercial step index profile plastic optical fibers ($\emptyset_{cladding}$=75 $\mu$m/125 $\mu$m /250 $\mu$m/380 $\mu$m/1500 $\mu$m/2000 $\mu$m/3000 $\mu$m).

The moulding material enclosing the plastic optical fiber which is applied by co- or tandem extrusion protects the sensitive plastic optical fiber 2, 3 from outer influences. Its thickness is selected according to the above standard such that the outer diameter of the wave-guide $\emptyset_{wave-guide}$ is 2.2±0.1 mm ($\emptyset_{cladding}$=1000 $\mu$m or $\emptyset_{cladding}$=750 $\mu$m) or $\emptyset_{wave-guide}$=1.5±0.1 mm ($\emptyset_{cladding}$=500 $\mu$m).

The moulding material 4 which is used as the protective sheathing and particularly well adheres to the fluorine-containing polymer of the fiber cladding 3 is made of a modified PA whose maximum concentration of carboxylic terminal groups is 15 $\mu$eq/g and whose concentration of amino terminal groups is in the range of 50–300 $\mu$eq/g. The above concentration of amino terminal groups is adjusted by an aminic chain transfer agent added to the not yet completely polymerized PA (single polymerization of the chain transfer agent). Examples of chain transfer agents are hexyl amine, octyl amine, ethyl hexyl amine, tridecyl amine, dibutyl amine, stearyl amine and other aliphatic, cycloaliphatic or aromatic monoamines having 2–44 C atoms, in particular 4–36 C atoms, as well as diamines such as 1,4-diaminobutane, 1,6-diaminohexane, diaminocyclohexane, 1,10-diaminodecane, 1,12-diaminododecane, m- or p-xylylene diamine, cyclohexyl dimethylene diamine, bis-(p-aminocyclohexyl) methane as well as other aliphatic, cycloaliphatic or aromatic amines having 2–44 C atoms, in particular 6–36 C atoms, and the excess of an aminic difunctional monomer which is the main component of the polyamide.

Suitable polyamides for the purposes of the invention are homo- and copolyamides which can be processed at sufficiently low temperatures, i.e. at a maximum of 220° C., so as not to damage the cladding and fiber core of the plastic optical fiber. According to the invention it is essential that the polyamides used have a relative viscosity below 2.0, in particular below 1.8 and particularly preferably 1.4–1.8 (relative viscosity: 0.5% measured in m-cresol at 20° C.).

Such polyamides may also be made up of polyamide-forming monomers such as caprolactam, laurine lactam, amino hexanoic acid, amino undecanoic acid, dodecanedioic acid, dimeric acid, terephthalic acid, isophthalic acid, cyclohexane dicarboxylic acid, naphthalene dicarboxylic acid, tert-butyl isophthalic acid, phenylindane dicarboxylic acid, diaminobutane, hexamethylene diamine, methyl pentamethylene diamine, 3,3-dimethyl-4,4-xylylene diamine, 2,2-bis (p-aminocyclohexyl) propane, bis(p-aminocyclohexyl) methane, isophorone diamine, polypropyleneglycol diamine, norbonane diamine, 1,3-bis(aminomethyl) cyclohexane, TCD diamine if they have a melting point up to a maximum of 220° C., preferably below 210° C. and particularly preferably below 200° C. These include according to the invention in particular PA 11, PA 12, PA 610, PA 612, PA 1212 or the copolyamides PA 6/12, PA 6/9/6, PA 6/9/12, PA 610/6, PA 610/11, PA 610/12, PA 612/6, PA 612/11, PA 612/12 or mixtures thereof, PA 12 being particularly preferred.

To the polyamides having the above structure, normal additives such as UV and heat stabilizers, crystallization promoters, softeners, flameproofing agents, external lubricants, and an organic fillers may be added.

The following method was used to test the adherence of the protective sheathing 4 made of a modified polyamide to the fiber cladding 3:

partial shouldering of the protective sheathing of a wave-guide approx. 500 mm in length in such a way that the length of the remaining protective sheathing is approx. 30 mm;

leading the shouldered portion of the wave-guide through the hole of a plate, the diameter of the hole being ≈1.1 mm which is somewhat larger than the outer diameter of the fiber cladding;

chucking the shouldered end of the wave-guide into a tensile testing machine (drawing-off rate: 10 mm/min); and measuring the tensile force at which the protective sheathing becomes detached from the cladding of the plastic optical fiber.

The PA 12 types given in the Table below were subjected to the test.

| Polymer | Concentration of $NH_2$ terminal groups | Concentration of COOH terminal groups | Relative viscosity: 0.5% in m-cresol at 20° C. | |
|---|---|---|---|---|
| PA No. 1 | 10 | 95 | 1.65 | PA not according to the invention |
| PA No. 2 | 95 | <15 | 1.66 | PA according to the invention |
| PA No. 3 | 134 | <5 | 1.58 | PA according to the invention |
| PA No. 4 | 173 | <5 | 1.47 | PA according to the invention |

The test showed that the tensile force required for stripping the protective sheathing made of PA No. 1 amounted to a minimum of 11 N (no adherence), typically 40–50 N and a maximum of 51 N, due to the very different adherence of the protective sheathing to the respective plastic optical fiber from specimen to specimen. The stripping forces measured for wave-guides with the protective PA sheathings according to the invention ranged from 68–75 N and hence varied to a clearly less extent. The measured maximum value of the stripping force of 75 N is surprising all the more as the extrusion temperature for the moulding material making up the protective sheathing was to amount to only approx. 185–200° C. due to the comparatively low glass-transition temperature of the PMMA ($T_G$≈100–110° C.) used as the core material.

A comparatively large stripping force was also measured for an optical wave-guide whose protective sheathing was made of the PA disclosed in EP 0 767 190 A1. However, this PA is not suitable for the above applications, as the heat storage (24 hours at 80° C.) of wave-guides is having an equivalent structure resulted in a browning of the outer cladding area.

The following three typical examples of wave-guides ($\emptyset_{cladding}$=1000 μm, $\emptyset_{protective\ sheathing}$=2.2 mm) were tested:

1) Optical wave-guide: type SB-1000, Asahi Chemical Industry Co., Ltd.;
   moulding material: Grilamid L16A (PA according to the invention),
   EMS-Chemie AG, CH-7013 Domat/Ems.
   Processing temperature of the moulding material: T=190° C.,
   processing speed: 60 m/min,
   stripping force: 68–75 N (average: 73 N).
2) Optical wave-guide: SB-1000;
   moulding material: Grilamid L16LM (PA not according to the invention),
   EMS-Chemie AG.
   Processing temperature: T=190° C.,
   processing speed: 60 m/min,
   stripping force: 48–51 N (average: 49 N).
3) Optical wave-guide: type TB-1000, Asahi Chemical Industry Co., Ltd.;
   moulding material: Grilamid L16LM (PA not according to the invention).
   Processing temperature: T=190° C.,
   processing speed: 60 m/min,
   stripping force: 7–18 N (average: 11 N).

It is to be understood that the invention is not limited to the embodiments described above. Without deviating from the scope of the invention, it is therefore possible to give the protective sheathing 4 of the optical wave-guide 1 a multilayer structure (see particularly WO 99/1203) or to provide it with a PVC cladding of ≈1–2 mm in thickness;

to embed reinforcing elements, in particular glass fibers, carbon fibers or mineral fibers, in the protective sheathing 4;

to admix fillers (carbon black, talcum, etc.) to the protective sheathing material; and to use one or several of the optical wave-guides 1 as light transmitting elements in the simplex, duplex, twin or hybrid cables known from A. Weinert: Kunststofflichtwellenleiter-Grundlagen, Komponenten, Installation (Plastic optical fibers: Fundamentals, Components, Installation), Publicis MCD Verlag, 1998, pp. 55–62.

What is claimed is:

1. An optical wave guide having at least one plastic optical fibre comprising a plastic optical fibre core, a fluorine-containing fibre cladding and a protective sheath self-adhesively applied to said at least one plastic optical fibre, wherein said protective sheath comprises polymeric compounds selected from the group consisting of modified polyamides, modified copolyamides and mixtures thereof having a melting point less than 220° C., a concentration of amino terminal groups between 50 and 300 eq/g, and a maximum concentration of carboxyl terminal groups no greater than 15 eq/g.

2. An optical wave guide according to claim 1 wherein said polymeric compounds have a meeting point of less than 210° C.

3. An optical wave-guide according to claim 1 wherein said modified polyamides are selected from the group consisting of modified PA 11, modified PA 12, modified PA 610, modified PA 612, and modified PA 1212.

4. An optical wave-guide according to claim 1 wherein said modified copolyamides are selected from the group consisting of modified PA 6/12, modified PA 6/9/6, modified PA 6/9/12, modified PA 610/6, modified PA 610/11, modified PA 610/12, modified PA 612/6, modified PA 612/11, modified PA 612/12, and mixtures thereof.

5. An optical wave guide according to claim 1 wherein at least one modified polyamide, modified copolyamide or mixture comprises modified PA 12.

6. An optical wave-guide according to claim 1 wherein said protective sheath further comprises at least one additive selected from the group consisting of UV stabilizers, heat stabilizers, crystallization promoters, softeners, flame retardants, external lubricants, and inorganic fillers.

7. An optical wave-guide according to claim 1 wherein said plastic fibre core is formed from polymethymethacrylate.

8. An optical wave-guide according to claim 1 wherein said plastic optical fibre has an outer diameter of between approximately 75 and approximately 3000 μm.

9. An optical wave-guide according to claim 1 wherein the thickness of the fluorine containing fibre cladding is between 5 and 10 μm.

10. An optical wave-guide according to claim 3 wherein the concentration of amino terminal groups is between 90 and 250 eq/g.

11. A protective sheath for an optical wave guide having at least one plastic optical fibre comprising a plastic optical fibre core and a fluorine-containing fibre cladding, said sheath comprising polymeric compounds selected from the group consisting of modified polyamides, modified copolyamides and mixtures thereof having a melting point of less than 220° C., a concentration of amino terminal groups between 50 and 300 eq/g, and a maximum concentration of carboxyl terminal groups no greater than 15 eq/g.

12. A protective sheath according to claim 11 wherein said polymeric compounds have a meeting point of less than 210° C.

13. A protective sheath according to claim 11 wherein said modified polyamides are selected from the group consisting of modified PA 11, modified PA 12, modified PA 610, modified PA 612 and modified PA 1212.

14. A protective sheath according to claim 11 wherein said modified copolyamides are selected from the group consisting of modified PA 6/12, modified PA 6/9/6, modified PA 6/9/12, PA 610/11, modified PA 610/12, modified PA 612/6, modified PA 612/11, modified PA 612/12, and mixtures thereof.

15. A protective sheath according to claim 11 wherein at least one modified polyamide, modified copolyamide or mixture comprises PA 12.

16. A protective sheath according to claim 11 wherein the concentration of amino terminal groups is between 90 and 250 eq/g.

17. A protective sheath according to claim 11 wherein said protective sheath further comprises at least one additive selected from the group consisting of UV stabilizers, heat stabilizers, crystallization promoters, softeners, flame retardants, external lubricants, and inorganic fillers.

* * * * *